Oct. 7, 1952

W. TODD 2,613,347

MODULATOR FOR RADIOSONDE APPARATUS

Filed Sept. 12, 1945

*INVENTOR.*
WILLIAM TODD

BY
ATTORNEY

Oct. 7, 1952 W. TODD 2,613,347
MODULATOR FOR RADIOSONDE APPARATUS
Filed Sept. 12, 1945 2 SHEETS—SHEET 2

*INVENTOR.*
WILLIAM TODD
BY
*William D. Hall.*
ATTORNEY

Patented Oct. 7, 1952

2,613,347

UNITED STATES PATENT OFFICE 2,613,347

MODULATOR FOR RADIOSONDE APPARATUS

William Todd, Neptune City, N. J., assignor to the United States of America as represented by the Secretary of War Application September 12, 1945, Serial No. 615,902

3 Claims. (Cl. 332—2)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to meteorological apparatus and relates more particularly to a radiosonde system adapted to investigate atmospheric conditions at various altitudes.

In recent years it has become the practice to obtain information pertaining to the atmosphere at high altitudes through the use of balloons, by means of which meteorological instruments are carried aloft to transmit data on temperature, pressure, and humidity to a ground receiving device. In employing this technique it is also desirable to track the course of such balloons in flight in order to obtain data on the velocity and direction of winds at various altitudes. To make such determinations of practical value it is necessary to follow the course of balloons to high altitudes and over appreciable distances.

Although balloons have been tracked in the past by optical means, with the development of radio it has become feasible not only to track balloons but also to convey pertinent information on atmospheric conditions from the aerial vehicle to the ground by means of radio waves. A compact, light-weight transmitter may be borne aloft by a balloon and may be so associated with suitable meteorological instruments as to be modulated in accordance with the atmospheric conditions encountered. The carrier wave also provides the medium through which the course of the apparatus in flight is followed by means of a plurality of directive receiving antennas in a manner well known in the art.

Heretofore, meteorological instruments have been used to produce amplitude modulation of the balloon transmitter. This intelligence impressed on the carrier conveys the desired information pertaining to the atmospheric conditions. However, an amplitude modulated carrier is not well adapted for use in tracking the course of the balloon in flight. A carrier of constant amplitude can provide a medium for more accurate determinations of azimuth and elevation, since such determinations are made by comparing the strength of the signals picked up by a plurality of associated directive antennas.

The present invention contemplates frequency modulation of the carrier to convey the intelligence, thereby providing a carrier of substantially constant amplitude by which the course of the transmitter in flight may be accurately followed.

It is an object of the present invention to provide an improved radiosonde system employing frequency modulated carrier waves.

It is another object of the present invention to provide a radio communication system between an aerial vehicle and the ground whereby atmospheric conditions at various altitudes may be ascertained.

It is a further specific object of the present invention to provide a radiosonde system in which the course of an aerial vehicle bearing meteorological instruments may be tracked by reception of a carrier wave of constant amplitude.

These and other objects and advantages of the present invention will become readily apparent from a perusal of the following detailed description taken in connection with the accompanying drawing in which:

Figure 4 is a block diagram of a two channel receiver which may be positioned on the ground to receive the signals radiated by the transmitter of Figure 1.

Figure 1:
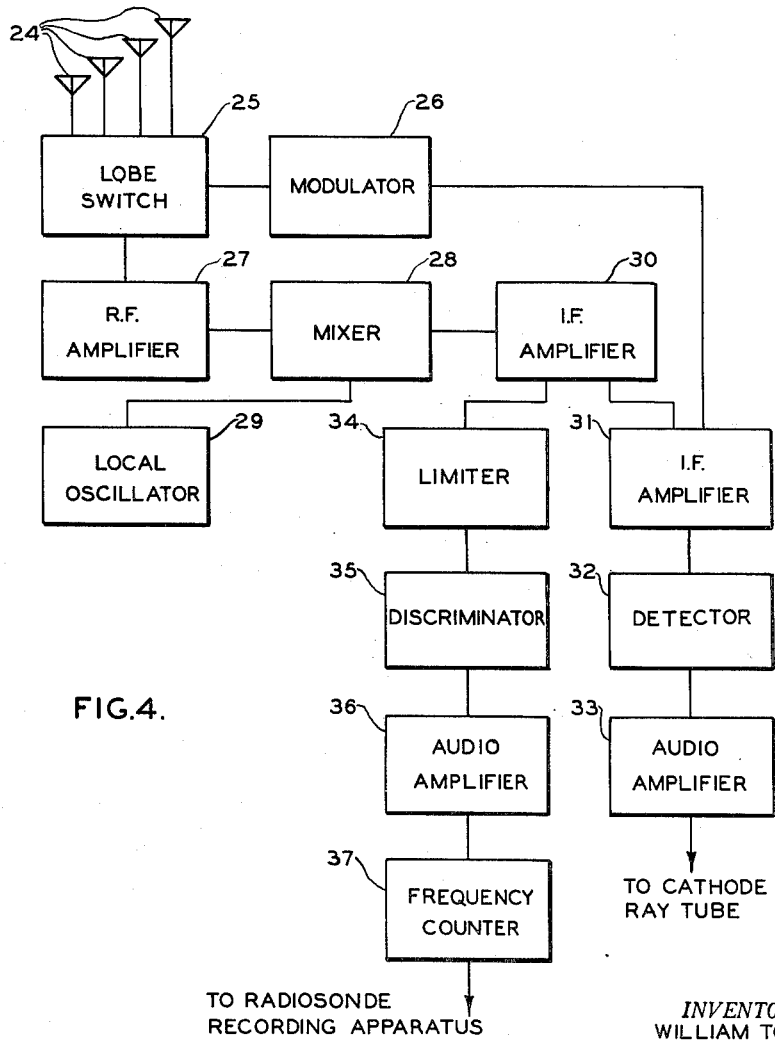
Figure 1 is a block diagram of a transmitter which may be borne aloft by a balloon or other suitable means.

Referring to Figure 1, an ultra high frequency transmitter 5 is frequency modulated by a modulator 6, which is so associated with meteorological instruments 7 that the repetition rate of frequency deviation of the carrier wave radiated by an antenna 8 will be a function of the particular atmospheric condition under observation.

Figure 2:
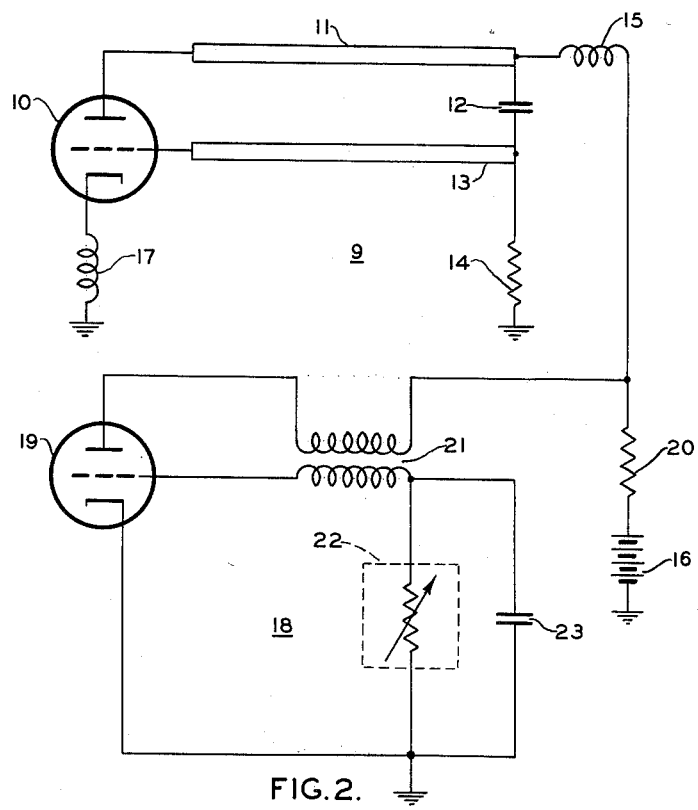
Figure 2 is a schematic diagram of the transmitter represented in Figure 1.

The above is accomplished by the circuit shown in Figure 2. A parallel lines oscillator 9 is adapted to generate radio frequency currents in the order of 400 megacycles per second. A triode 10, which may be of the high frequency acorn type is provided with a plate line 11 which is connected through capacitor 12 to a grid line 13. A grid resistor 14 connects the grid line to ground and a radio frequency choke 15 isolates the high frequency tank circuit from the plate voltage supply 16. The cathode of triode 10 is returned to ground through a radio frequency choke 17, and a suitable heater circuit, not shown, may be provided.

A modulator 18 is employed to provide frequency variations in the alternating current generated by the oscillator 9. The modulator includes a triode 19 having a plate circuit which shares resistor 20 with the plate circuit of the oscillator 9. The modulator 18 is in effect a low frequency oscillator, the feedback to the grid of triode 19 being provided by transformer 21. A meteorological instrument 22, represented as a variable resistor, provides the return to ground for the grid of triode 19 and is in parallel combination with a capacitor 23.

Figure 3:
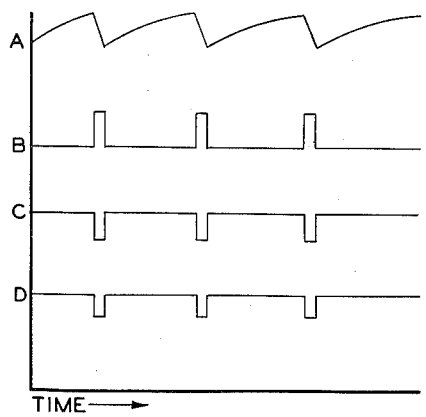
Figure 3 is a graph of currents, voltages, and frequency to be read with reference to the schematic diagram in Figure 2.

The period of oscillation of the modulator 18 is determined by the time constant of the resistor 22 in combination with the capacitor 23. In Figure 3, graph A represents the voltage between the grid and cathode of triode 19. Corresponding pulses of plate current, graph B, rising from zero to some finite value, appear in the plate circuit of triode 19, the repetition rate of these pulses being a function of the time constant as already explained. Since the plate circuit of the modulator 18 and the plate circuit of the oscillator 9 include the common resistor 20, it is evident that the plate current pulses from the modulator, graph B, produce appreciable variations in the voltage applied to the plate of triode 10, such variations being illustrated by graph C of Figure 3. The operating points on the characteristic curves of triode 10 are so chosen that these plate voltage variations produce variations in the transit time of the electrons within this tube and thus produce frequency changes in the output frequency of the oscillator 9, such variations being illustrated by graph D of Figure 3. Thus when the plate voltage of triode 10 decreases during modulation, the frequency of oscillator 9 decreases. Oscillator 9 is therefore frequency modulated, the deviations from the resting frequency occurring at a rate which is a function of the value of the resistor 22 in the grid circuit of the modulator 18. Since resistor 22 represents a meteorological instrument which translates a given atmospheric condition into a definite resistance value, the frequency modulated carrier radiated by the antenna 8 of Figure 1 will provide radio signals conveying the desired meteorological information. It should be noted that in practice it is desirable to employ a plurality of meteorological instruments represented by the resistor 22 of Figure 2. They may be automatically connected into the circuit in predetermined sequence by any suitable mechanical or electrical means well known in the art.

A receiver adapted to detect the radio signals radiated from the aerial transmitter is shown in Figure 4 and comprises a plurality of directive antennas 24, a lobe switch 25 for multiple tracking, a modulator 26, a radio frequency amplifier 27 the output of which is heterodyned in a mixer 28 with the output of a local oscillator 29, an intermediate frequency amplifier 30, and two separate intelligence channels.

The direction finding channel comprises an intermediate frequency amplifier 31, a detector 32, and an audio amplifier 33, the output of which provides deflection voltages for a cathode ray tube. The modulator 26 produces intermittent operation of the direction finding channel in synchronism with the lobe switching cycle whereby the azimuth and elevation of the aerial vehicle bearing the transmitter may be ascertained by adjustment of the bearing of the receiving antennas until the intensity of the signal received under each lobe condition is equal. Since the frequency deviations of the carrier are well within the band pass of the receiver stages, there will be substantially no variations in signal strength resulting from frequency discrimination, thus enabling the operator to track the course of the aerial vehicle with great accuracy.

The radiosonde channel comprises a limiter 34, a discriminator 35, and an audio amplifier 36, the output of which is utilized to actuate a frequency counter 37 and suitable radiosonde recording equipment. As explained in connection with the transmitter of Figure 1, the modulation component of the carrier is a function of the atmospheric conditions under observation. The radiosonde channel translates the repetition rate of frequency deviation of the carrier into signals the frequency of which conveys the desired meteorological data.

By employing a frequency modulated radiosonde system the invention provides an effective means for both transmitting meteorological data and tracking the course of the aerial vehicle by which the radiosonde apparatus is borne aloft.

While the present invention has been explained in detail and a preferred embodiment thereof described, it is understood that modifications falling within the spirit and scope of the invention as defined by the appended claims may occur to persons skilled in the art.

What is claimed is:

1. In a radiosonde transmitter for transmitting signals varying in accordance with atmospheric conditions, a vacuum tube oscillator, a modulator for modulating the oscillator output, said modulator including a vacuum tube whose grid circuit includes a resistance whose value is altered in accordance with changes in atmospheric conditions to vary the frequency of the modulator, and a resistor common to the plate circuits of both said vacuum tube oscillator and said modulator and coupled to a source of positive plate potential, whereby variations in the frequency of said modulator will cause the plate voltage of said vacuum tube oscillator to be similarly modulated and thereby modulate the output of said oscillator.

2. A transmitter as set forth in claim 1, wherein said vacuum tube oscillator is a high frequency oscillator utilizing resonant lines as tuned circuits.

3. A radiosonde high frequency transmitter for transmitting signals varying in accordance with atmospheric conditions, including a triode vacuum tube transmitting oscillator including a resonant line having a first conductor connected to the plate of said triode transmitting oscillator and a second conductor connected to the grid of said triode transmitting oscillator, and a coupling capacitor connected between said first and second conductors, a triode vacuum tube modulating oscillator, resistive means coupled to said modulating oscillator for varying its frequency in accordance with atmospheric conditions, and a resistor and a high positive potential source connected in series and common to the plate circuits of both said triode transmitting oscillator and said triode modulating oscillator, whereby the frequency variations of said modulating oscillator, through the action of said common resistor, cause the plate potential of said transmitting oscillator to be similarly modulated and thus frequency modulate said transmitting oscillator by varying the transit time of electrons within said triode transmitting oscillator.

WILLIAM TODD.

REFERENCES CITED

The following references are of record in the file of this patent:

UNITED STATES PATENTS

| Number | Name | Date |
| --- | --- | --- |
| 2,027,367 | Blair | Jan. 14, 1936 |
| 2,042,490 | Zahl | June 2, 1936 |
| 2,090,359 | Robinson | Aug. 17, 1937 |
| 2,151,336 | Scharlau | Mar. 21, 1939 |
| 2,210,903 | Dunmore | Aug. 13, 1940 |
| 2,283,793 | Cork et al. | May 19, 1942 |
| 2,295,570 | Dunmore | Sept. 14, 1942 |
| 2,323,317 | Dunmore | July 6, 1943 |
| 2,378,604 | Wallace | June 19, 1945 |
| 2,405,930 | Goldberg | Aug. 13, 1946 |
| 2,410,917 | Yuan et al. | Nov. 12, 1946 |
| 2,427,660 | Colton | Sept. 23, 1947 |
| 2,437,286 | Witt | Mar. 9, 1948 |
| 2,440,264 | Grieg | Apr. 27, 1948 |
| 2,473,610 | Rieber | June 21, 1949 |
| 2,500,186 | Kline | Mar. 14, 1950 |

OTHER REFERENCES

"The Radio Sonde," Proceedings of the IRE, vol. 31, No. 9, September 1943, pages 479 to 485.